United States Patent
Kapadia et al.

(10) Patent No.: US 9,838,315 B2
(45) Date of Patent: Dec. 5, 2017

(54) STRETCHED SUBNET ROUTING

(71) Applicant: Cisco Technology, Inc., San Jose, CA (US)

(72) Inventors: Shyam Kapadia, San Jose, CA (US); Lukas Krattiger, Pleasanton, CA (US); Vrishab Sikand, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 221 days.

(21) Appl. No.: 14/811,861

(22) Filed: Jul. 29, 2015

(65) Prior Publication Data

US 2017/0034057 A1  Feb. 2, 2017

(51) Int. Cl.
| | |
|---|---|
| *H04L 12/741* | (2013.01) |
| *H04L 12/721* | (2013.01) |
| *H04L 12/715* | (2013.01) |
| *H04L 12/931* | (2013.01) |
| *H04L 12/66* | (2006.01) |

(52) U.S. Cl.
CPC ............ *H04L 45/745* (2013.01); *H04L 45/04* (2013.01); *H04L 45/54* (2013.01); *H04L 45/72* (2013.01); *H04L 12/66* (2013.01); *H04L 49/70* (2013.01)

(58) Field of Classification Search
CPC .................................................... H04L 45/745
USPC .......................................................... 709/238
See application file for complete search history.

(56) References Cited

U.S. PATENT DOCUMENTS

| | | | | |
|---|---|---|---|---|
| 5,251,205 | A * | 10/1993 | Callon | H04L 29/06 370/392 |
| 6,553,002 | B1 * | 4/2003 | Bremer | H04L 45/00 370/254 |
| 7,185,107 | B1 * | 2/2007 | Cassar | H04L 61/6068 370/346 |
| 8,346,899 | B2 * | 1/2013 | Shah | H04L 49/357 709/220 |
| 8,560,663 | B2 * | 10/2013 | Baucke | H04L 45/50 370/255 |

(Continued)

OTHER PUBLICATIONS

Chandramouli, "Analysis of Network Segmentation Techniques in Cloud Data Centers", 2015.*

(Continued)

*Primary Examiner* — O. C. Vostal
(74) *Attorney, Agent, or Firm* — Samuel M. Katz

(57) ABSTRACT

In one embodiment, a method for improving routing for a stretched subnet includes receiving a first communication on a border leaf of the stretched subnet, where the border leaf is a top of rack (ToR) switch configured to facilitate connectivity between an internal data center fabric and at least one external site associated with the stretched subnet, based on routing information received with the received communication, identifying a source address for the received communication as either from within the internal data center fabric or from the at least one external site, and if the source address is from the external site, storing an abbreviated route based on the source address in at least one hardware table, where the abbreviated route is a route to the at least one external site, and upon subsequent receipt of a second communication to be forwarded to the source address, forwarding the second communication in accordance with the abbreviated route.

19 Claims, 4 Drawing Sheets

(56) References Cited

U.S. PATENT DOCUMENTS

| | | | | |
|---|---|---|---|---|
| 9,007,895 | B2* | 4/2015 | Schlansker | H04L 45/04 370/225 |
| 9,055,000 | B1* | 6/2015 | Ghosh | |
| 9,170,111 | B2* | 10/2015 | Boschker | G01C 21/00 |
| 9,225,597 | B2* | 12/2015 | Tubaltsev | H04L 45/02 |
| 9,391,796 | B1* | 7/2016 | Shekhar | H04L 12/40013 |
| 2003/0202473 | A1* | 10/2003 | Patrick | H04L 45/02 370/235 |
| 2005/0050225 | A1* | 3/2005 | Tatman | H04L 45/04 709/244 |
| 2005/0114653 | A1* | 5/2005 | Sudia | H04L 63/0823 713/158 |
| 2009/0217351 | A1* | 8/2009 | Burch | H04L 63/0281 726/3 |
| 2009/0248291 | A1* | 10/2009 | Poppen | G01C 21/32 701/532 |
| 2009/0307334 | A1* | 12/2009 | Maltz | H04L 29/12028 709/219 |
| 2010/0036903 | A1* | 2/2010 | Ahmad | H04L 67/1002 709/202 |
| 2010/0115133 | A1* | 5/2010 | Joshi | H04L 29/12792 709/245 |
| 2012/0014386 | A1* | 1/2012 | Xiong | H04L 29/12028 370/392 |
| 2013/0044748 | A1* | 2/2013 | Shah | H04L 12/413 370/355 |
| 2013/0086236 | A1* | 4/2013 | Baucke | H04L 45/50 709/223 |
| 2013/0114607 | A1* | 5/2013 | McGovern | H04L 12/4641 370/395.53 |
| 2013/0195105 | A1* | 8/2013 | Basso | H04L 45/72 370/389 |
| 2013/0261954 | A1* | 10/2013 | Boschker | G01C 21/00 701/410 |
| 2013/0287397 | A1* | 10/2013 | Frankel | H04B 10/271 398/50 |
| 2013/0308496 | A1* | 11/2013 | Manur | H04L 12/4625 370/255 |
| 2013/0322441 | A1* | 12/2013 | Anumala | H04L 12/4675 370/390 |
| 2014/0092901 | A1* | 4/2014 | Kapadia | H04L 45/745 370/390 |
| 2014/0140244 | A1* | 5/2014 | Kapadia | H04L 61/103 370/255 |
| 2014/0180584 | A1* | 6/2014 | Carnevali | G01C 21/00 701/533 |
| 2014/0258479 | A1* | 9/2014 | Tenginakai | H04L 41/082 709/220 |
| 2015/0010002 | A1* | 1/2015 | Duda | H04L 45/74 370/392 |
| 2015/0063360 | A1* | 3/2015 | Thakkar | H04L 45/745 370/400 |
| 2015/0100704 | A1* | 4/2015 | Davie | H04L 45/14 709/238 |
| 2015/0188815 | A1* | 7/2015 | Liu | H04L 45/741 370/392 |
| 2016/0036838 | A1* | 2/2016 | Jain | H04L 63/1416 726/23 |
| 2016/0043941 | A1* | 2/2016 | D'Heureuse | H04L 41/0896 370/390 |
| 2016/0197876 | A1* | 7/2016 | Bui | H04L 61/103 370/392 |
| 2016/0380886 | A1* | 12/2016 | Blair | H04L 45/50 398/49 |

OTHER PUBLICATIONS

Dunbar et al., "BCP for ARP-ND Scaling for Large Data Centers", 2012.*
Dunbar et al., "Practices for Scaling ARP and Neighbor Discovery (ND) in Large Data Centers", RFC7342, 2014.*
Narten et al., "Problem Statement: Overlays for Network Virtualization", RFC7364, 2014.*
Sajassi et al., "E-VPN Seamless Interoperability with IP-VPN", 2012.*
Jung et al., "Multi-hop data forwarding method for crowd sensing networks", 2014-2015.*
Malkin, "RIP Version 2 Carrying Additional Information", RFC1388, 1993.*
Perez et al., "Abbreviated Dynamic Source Routing: Source Routing with Non-Unique Network Identifiers*", 2005.*

* cited by examiner

STRETCHED SUBNET ROUTING

FIELD OF THE INVENTION

The present invention generally relates to routing to a remote host in an exterior network fabric.

BACKGROUND OF THE INVENTION

Interconnected data centers, such as those implemented using Data Center Interconnect (DCI) from Cisco Systems, Inc., are typically configured with a distributed anycast gateway and an enhanced forwarding mode that can be enabled for any subnet. Such a configuration facilitates routing both intra and inter-subnet traffic in generally the same consistent manner to optimize forwarding within a network fabric. The configuration also provides localization of the broadcast domain and prevents flooding within the fabric.

Multi-Protocol Border Gateway Protocol (MP-BGP) is typically used as the control protocol of choice to distribute host addresses within a given data center fabric. Consequently, traffic can be optimally forwarded to the appropriate top of rack (ToR) switch below which the destination host resides. The host route distribution also restricts a ToR switch or "leaf" to proxying for only "known" remote destinations.

BRIEF DESCRIPTION OF THE DRAWINGS

The present invention will be understood and appreciated more fully from the following detailed description, taken in conjunction with the drawings in which.

DESCRIPTION OF EXAMPLE EMBODIMENTS

Overview

Figure 1:
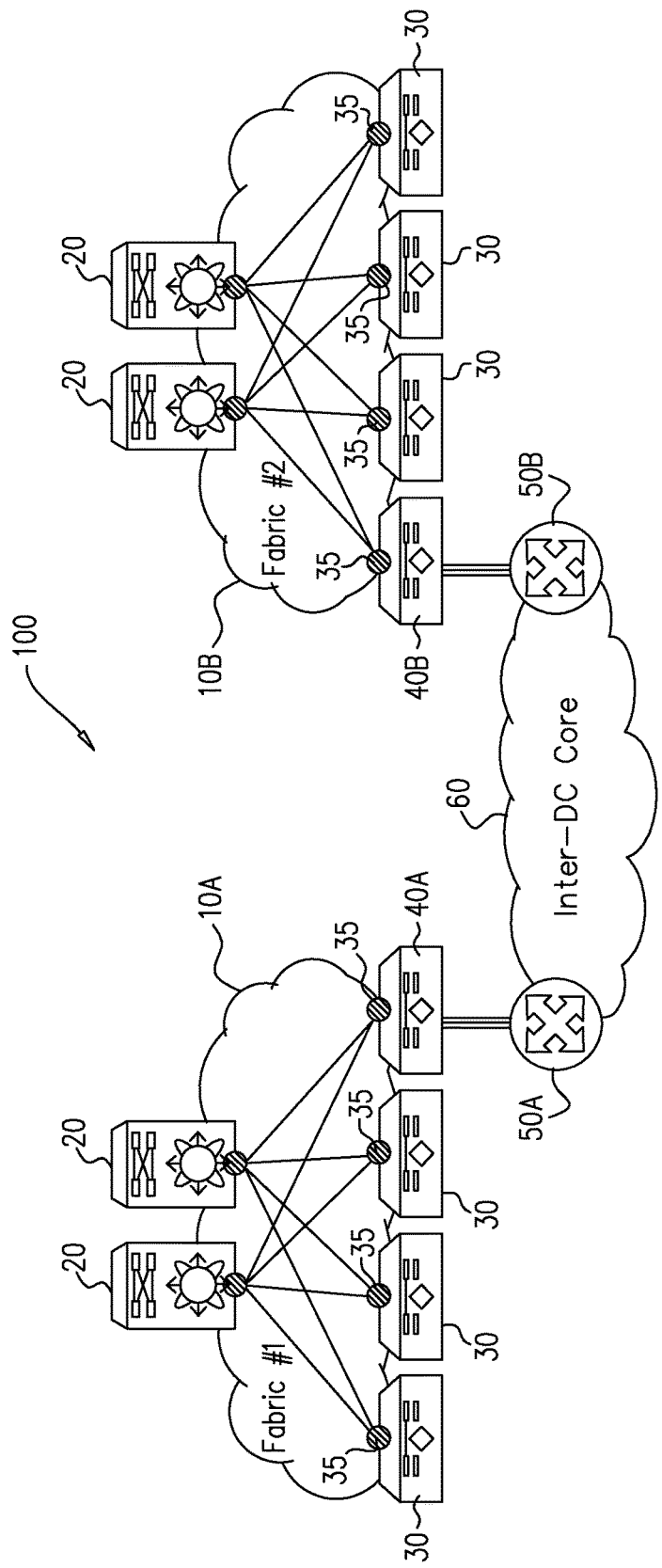
FIG. 1 is a simplified pictorial illustration of two exemplary data centers, constructed and operative in accordance with embodiments disclosed herein, and connected via an inter-DC (data center) core.

A method for improving routing for a stretched subnet includes receiving a first communication on a border leaf of the stretched subnet, where the border leaf is a top of rack (ToR) switch configured to facilitate connectivity between an internal data center fabric and at least one external site associated with the stretched subnet, based on routing information received with the received communication, identifying a source address for the received communication as either from within the internal data center fabric or from the at least one external site, and if the source address is from the external site, storing an abbreviated route based on the source address in at least one hardware table, where the abbreviated route is a route to the at least one external site, and upon subsequent receipt of a second communication to be forwarded to the source address, forwarding the second communication in accordance with the abbreviated route.

A method for improving routing for a stretched subnet includes on a ToR switch in an internal data center fabric of the stretched subnet, receiving routing information for a destination device, where the routing information comprises a destination address and an internal/external indication for the destination device, where the internal/external indication indicates whether the destination device is in the internal data center fabric or in an external data center fabric of the stretched subnet, and if the destination device is in the external data center fabric, storing an abbreviated route based on the destination address in at least one hardware table, where the abbreviated route is a route to the external data center fabric, and upon receipt of a communication to be forwarded to the destination address, forwarding the communication in accordance with the abbreviated route.

A method for increasing the number of destination devices in a stretched subnet includes in at least one hardware table on a ToR switch in a network fabric in the stretched subnet, defining a single abbreviated address for at least one external site in the stretched subnet, and routing all communications to each of the destination devices in the at least one external site according to the single abbreviated address.

DETAILED DESCRIPTION OF EXAMPLE EMBODIMENTS

Interconnected data centers provide flexibility in the form of stretched virtual routing and forwarding instances (vrfs), virtual fabrics and/or stretched subnets/vlans across multiple data center sites.

It is not uncommon for a data center customer or tenant to have multiple vrfs. These vrfs may have workloads that reside in different data center sites, thereby resulting in a layer-2 broadcast domain with a stretched subnet/vlan/segment that spans multiple data center sites. Existing enhanced forwarding semantics do address this issue, and provide host-based forwarding for any traffic (within or across subnets) irrespective of whether a destination of the traffic lies within the originating data center or in a second, target data center site. For example, Exterior Border Gateway Protocol (eBGP) running on the "border-leafs" (i.e., ToRs that connect with entities outside of the source fabric) is typically used to advertise host routes between different data center sites. For stretched subnets, the remote host routes are distributed from eBGP into iBGP (Interior Border Gateway Protocol), thereby resulting in the remote host routes being advertised throughout the fabric to all ToRs/leafs.

Typically, the gateway on the ToR switch is implemented in the form of an integrated-routing and bridging (IRB) interface, similar to a switch virtual interface (SVI). This implementation results in the installation of a subnet route with a glean adjacency in the FIB (Forwarding Information Base) LPM (longest prefix match) hardware table on the internal ToRs. With stretched subnets spanning multiple data centers, the host routes (with masks of /32 or /128 for IPv4 and IPv6, respectively) are also installed in a FIB hardware table, such as the HRT (host routing table) table, to ensure that traffic is destined to the right ToR switch below which the destination resides. Therefore, if a subnet is stretched across multiple data center sites, there may be a de facto requirement that every known host route from all of the involved data center fabrics is installed in the FIB hardware in each site.

Accordingly, in order to provide interconnectivity between multiple data centers, the number of entries in the FIB tables of each of the participating ToRs is effectively equivalent to the total number of known host destinations in the stretched subnet. It will therefore be appreciated that the maximum number of host destinations that may be supported by a stretched subnet is limited by the number of available entries in the participating ToR switches. For example, the FIB on a Cisco Nexus 6000 switch, has approximately 96,000 usable entries. Accordingly, a stretch subnet using a Nexus 6000 may not support more than a total of 96,000 host destinations across the interconnected data centers. It will be appreciated by one of ordinary skill that the embodiments described herein may support any other suitable ToR switch as well. It will similarly be appreciated by one of ordinary skill in the art that data centers are typically equipped with relatively inexpensive ToR switches in order to reduce costs.

In accordance with embodiments described herein, a stretch subnet may be configured to support routing for a total number of host destinations in excess of the number of entries in the FIB hardware tables. Reference is now made to FIG. 1 which illustrates an exemplary stretched subnet 100, constructed and operative in accordance with embodiments described herein to more optimally utilize the FIB resources on the internal ToR switches/leafs for cross-fabric stretched subnets while still providing optimized traffic forwarding for both within and cross fabric traffic.

Stretched subnet 100 comprises data center fabrics 10A and 10B, connected via inter data center core 60. Data center fabrics 10 may be implemented, for example, using Layer-2 DCI. Common technologies used to implement Layer-2 DCI are VPLS, OTV, Layer-2 LISP, etc. Inter data center core 60 may be implemented, for example, using Layer-3 DCI. Common technologies used for Layer-3 DCI are MPLS, Layer-3 LISP, etc.

Each data center fabric 10 comprises a multiplicity of ToR switches 30, each comprising a ToR gateway 35 to communicate with other ToR switches 30 via route reflectors 20. At least one ToR switch in each data center fabric 10 is configured as a border leaf 40 in communication with inter data center core 60 via edge router 50. Accordingly, a host in data center fabric 10A may communicate with a host in data center fabric 10B by first forwarding a communication through its associated ToR switch 30 via ToR gateway 30 and a route reflector 20 to border leaf 40A. The communication is then forwarded through inter data center core 60 by way of edge routers 50 to border leaf 40B in data center fabric 10B. The communication is then forwarded in similar manner to the destination host behind an associated ToR switch. It will be appreciated that border-leafs 40 and edge routers 50 may be combined into single integrated physical components such as, for example, a Cisco Nexus 7000 switch; they are depicted as separate entities in FIG. 1 to clarify the different functionalities that each may provide.

It will be appreciated by a person of ordinary skill in the art, that as per the configuration of stretched subnet 100, all communication from anywhere in data center 10A to anywhere in data center fabric 10B is routed through border leaf 40B. Therefore, in accordance with embodiments described herein, the original routing from the source fabric, i.e., data center fabric 10A, may be reduced to the route to the entry point to the target fabric, border leaf 40B in data center fabric 10B. Once the communication is received by border leaf 40B it may be routed to its intended destination. Accordingly, all of the destination hosts in data center fabric 10A may be represented in the FIB hardware tables in ToRs 30 in data center fabric 10B as a single entry detailing the route to data center fabric 10B.

Figure 2:
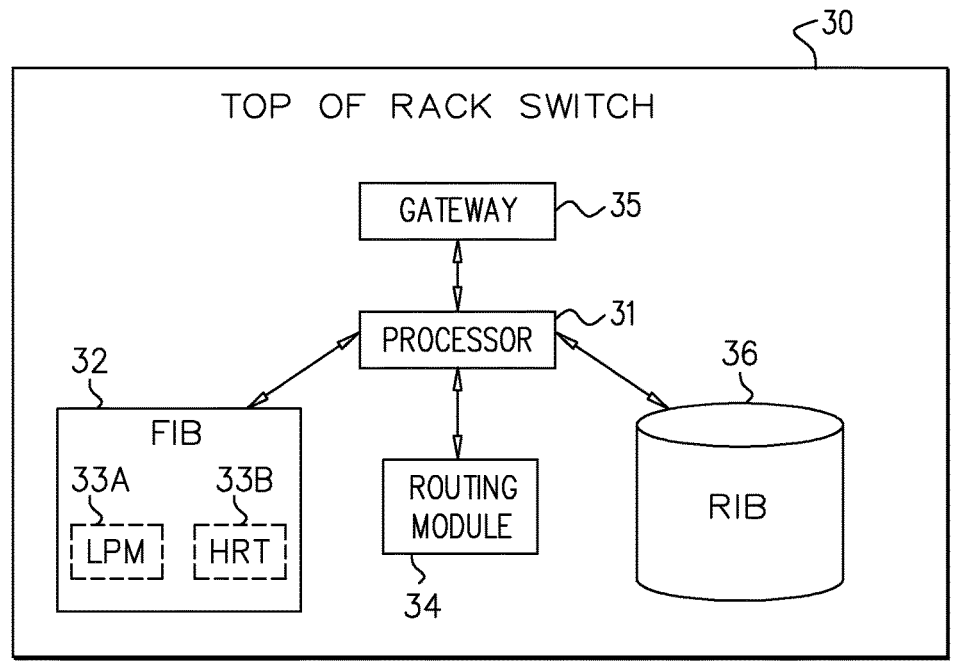
FIG. 2 is a schematic illustration of an exemplary ToR switch from the data centers of FIG. 1.
Figure 3:
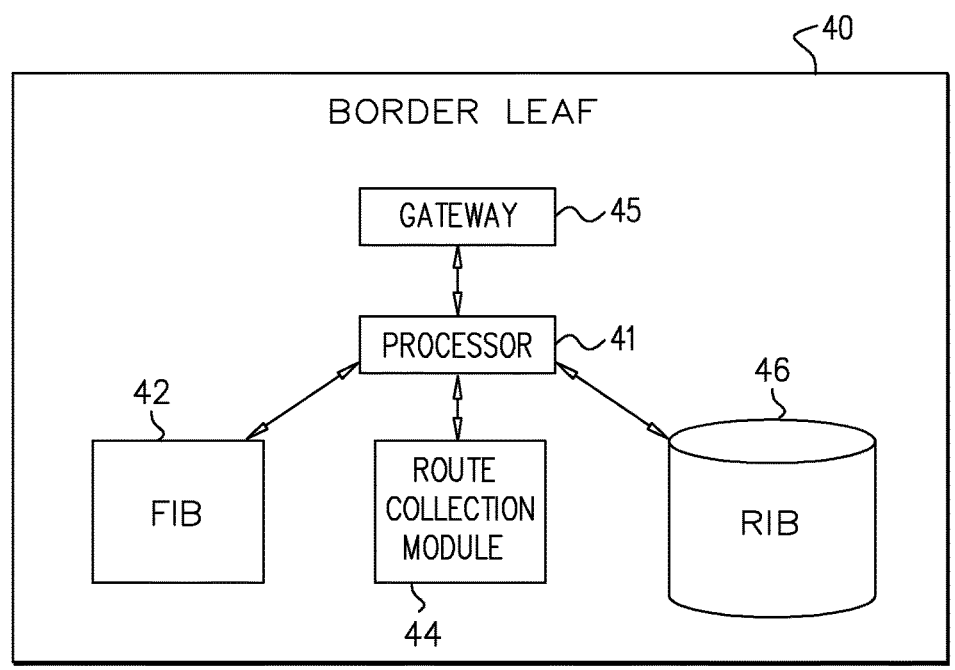
FIG. 3 is a schematic illustration of an exemplary border leaf from the data centers of FIG. 1.

Reference is now made also to FIGS. 2 and 3 which respectively illustrate an exemplary ToR switch 30 and an exemplary border leaf 40, constructed and operative in accordance with embodiments described herein. ToR 30 comprises processor 31, FIB 32, routing module 34, gateway 35 and routing information base (RIB) 36. Routing module 34 is an application implemented in either software, hardware, or a combination thereof. Processor 31 is operative to at least execute routing module 34 to at least update and maintain FIB 32 and RIB 36. FIB 32 is a hardware construct that, as described hereinabove, is used for routing to destinations both internal and external to a data center fabric 10. FIB 32 may comprise a multiplicity of FIB tables 33 to be used when routing communications in the source data center fabric 10. For example, FIB table 33A may be the longest prefix match (LPM) routing table; FIB table 33B may be the host routing table (HRT). RIB 36 is a software version of FIB 32 that may therefore not suffer from the same size limitations as FIB 32. Gateway 35 is operative to provide communications with other devices such as route reflectors 20 and/or local hosts under ToR switch 30.

Border leaf 40 comprises processor 41, FIB 42, route collection module 44, gateway 45, and RIB 46. Accordingly, processor 31 FIB 32, gateway 35 and routing information base (RIB) 36 may provide generally similar functionality as processor 41 FIB 42, gateway 45 and RIB 46, respectively. However, as will be described hereinbelow, routing module 34 and route collection module 44 may be configured to deliver slightly different functionality.

Figure 4:
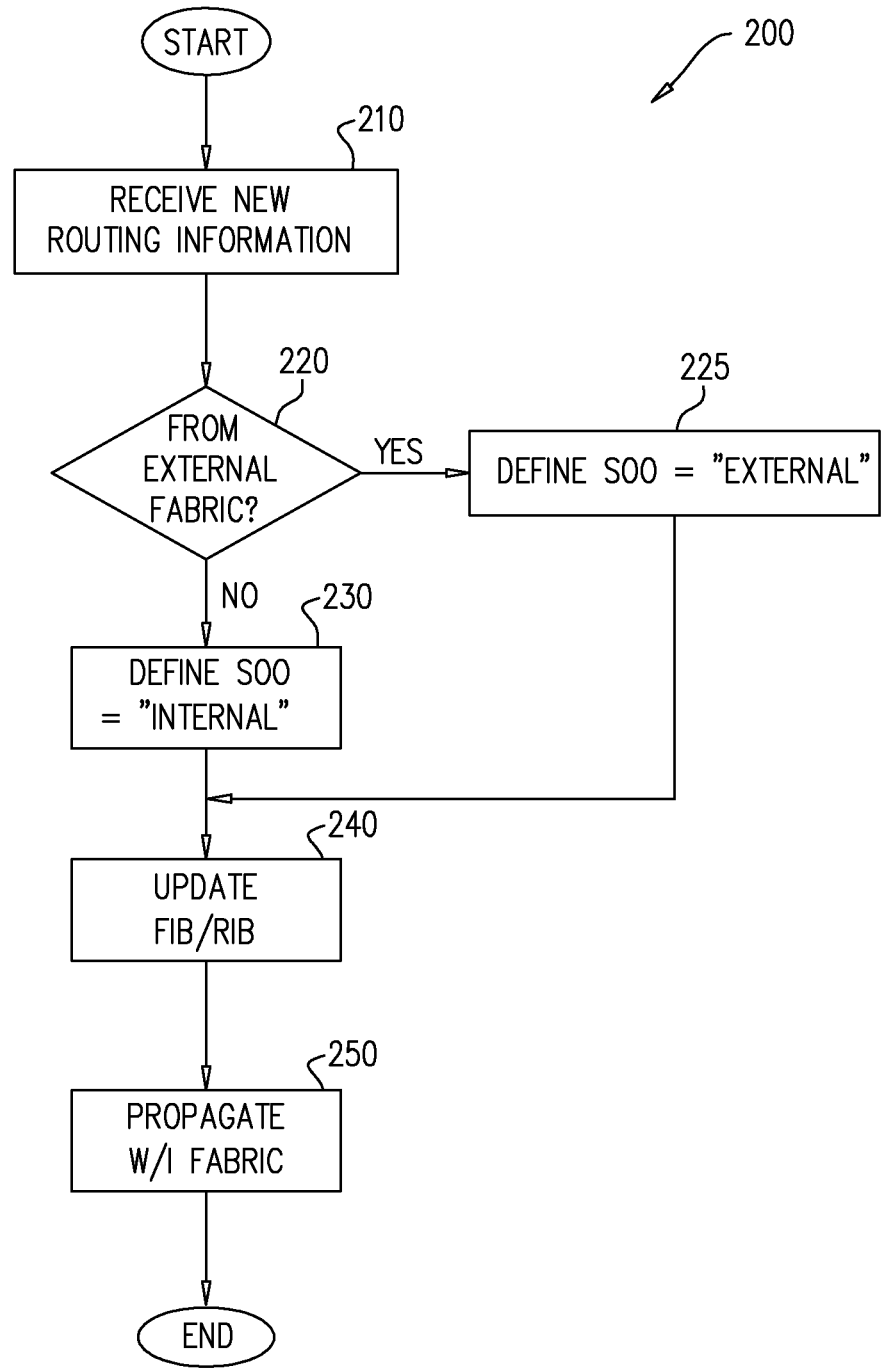
FIG. 4 is an exemplary process performed by the border leaf of FIG. 3.

Reference is now made to FIG. 4 which illustrates a FIB/RIB update process 200, constructed and operative in accordance with embodiments described herein. Process 200 is executed by route collection module 44 on border leaf 40. Route collection module 44 may receive (step 210) new routing information, i.e., a route which is currently not represented in FIB 42 and/or RIB 46. The routing information may accompany a communication that is received by border leaf 40 via gateway 45. It will be appreciated that the new routing information may represent either a source device for whose IP address there is no entry in FIB 42 and/or RIB 46, or a new IP address associated with a previously "known" device with new routing information, i.e., the source device has moved and/or there have been changes in the intervening route.

Based on the received routing information, route collection module 44 may determine whether or not the associated device is from an external data center fabric 10 (step 220). If so, then route collection module 44 may define the "site of origin" (SOO) as "external". Otherwise (step 230) route collection module 44 may define the "site of origin" (SOO) as "internal". Route collection module 44 then updates FIB 42 and RIB 46 with the new routing information and the SOO as per the IP address for the source device. It will be appreciated by one of ordinary skill in the art that the use of the SOO to indicate internal/external status may be exemplary; the embodiments described herein may support other functionality for indicating internal/external destinations. For example, an AS PATH tag may also be used in a similar manner.

Route collection module 44 then propagates (step 250) the updates from step 240 via gateway 45 to internal ToR switches 30. i.e., ToR switch 30 in the same data center fabric 10.

Figure 5:
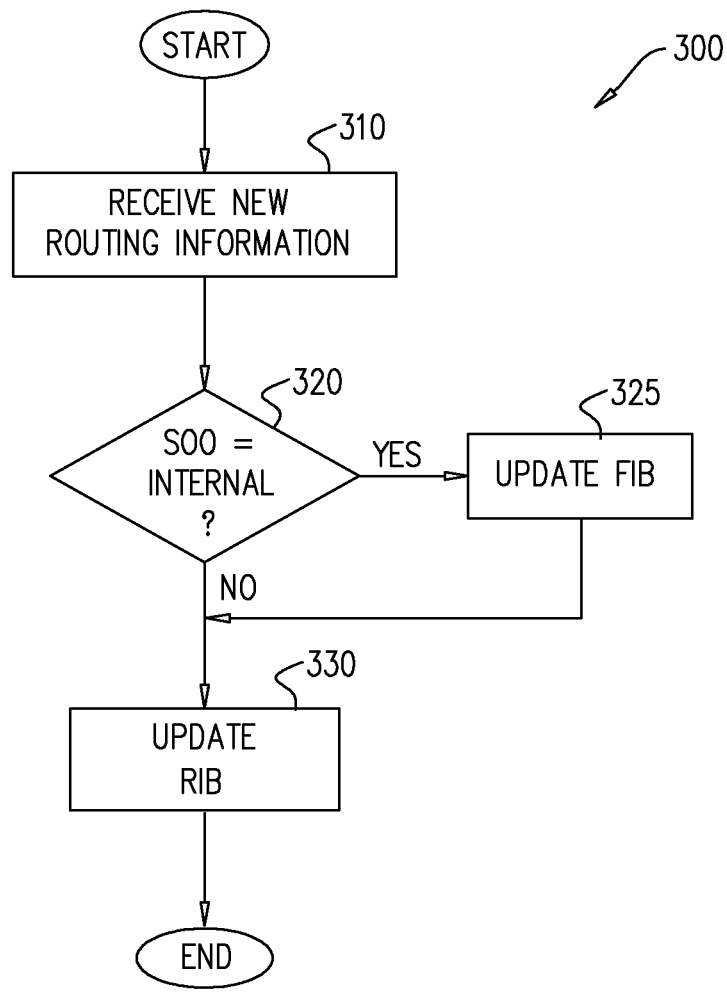
FIG. 5 is an exemplary process performed by the ToR switch of FIG. 2.

Reference is now made also to FIG. 5 which illustrates a FIB/RIB update process 300, constructed and operative in accordance with embodiments described herein. Process 300 is performed by routing module 34 on ToR switch 30. Routing module 34 may receive (step 310) new routing information, i.e., a route which is currently not represented in FIB 32 and/or RIB 36. The new routing information may, for example, be received as a product of propagation from border leaf 40 as per step 250 in process 200.

Routing module 34 may check the designation for SOO (step 320). If the SOO is set as "Internal", routing module 34 updates FIB tables 33 (FIG. 2) with the full route to be associated with the received IP address. Otherwise, routing module 34 may update FIB tables 33 with an abbreviated route to border leaf 40 to be associated with an identifier for the external SOO. Routing module 34 then updates RIB 46 with the new routing information as per the IP address for the source device. It will be appreciated by one of ordinary skill in the art, that routing module 34 may be configured to use other designations for step 320. For example, AS PATH may also be used in a similar manner.

It will be appreciated by a person of ordinary skill in the art, that after updating FIB tables 33 as per process 300, the use of entries in FIB tables 33 may be optimized such that, instead of a single entry for destination host, a single entry may be used for all external destination fabrics. For example, as will be appreciated by a person of ordinary skill in the art, a given border leaf 40, such as border leaf 40A in FIG. 1, may connect a network fabric, such as network fabric 10A with multiple network fabrics 10 via edge routers 50 and inter-DC core 60. Accordingly, if, per the limitation of 96,000 entries as discussed hereinabove, there had previously been a limit of 96,000 possible destination hosts, the embodiments described herein may support a limit of 96,000 possible destination hosts in a virtually unlimited number of fabrics.

It will similarly be appreciated that with the semantics of enhanced forwarding, as described hereinabove, all inter and intra-subnet traffic may be handled in generally the same manner via routing. The embodiments described herein therefore generally support the following rules:

A subnet glean entry for enhanced forwarding enabled subnets may not need to be installed on the internal leafs. There may be no need for Address Resolution Protocol (ARP) generation for unknown hosts with enhanced forwarding. The vrf default route on all the internal leafs points to one or more border leafs that are the transit to traffic destined to hosts in other data center sites (see FIG. 1).

For non-stretched subnets hosted in other data center sites, the corresponding subnet prefixes do not need to be advertised inside the fabric. However, for stretched subnets, since a leaf may only proxy on behalf of known destinations, host routes in remote data center sites must still be advertised to the internal leafs via iBGP. The host routes in other data center sites may not be installed in the FIB hardware table of the internal leafs. These host routes may be distinguished based on that fact that they are tagged with a different fabric site-of-origin (SOO) tags. Note that traffic destined to these hosts may be routed via the vrf default route and is forwarded to one of the border-leafs.

On the border leafs themselves, the subnet prefixes corresponding to the enhanced forwarding subnets may be installed as glean to ensure that routed traffic destined to unknown destinations is appropriately handled (for example generation of ICMP unreachable messages etc.).

It will therefore be appreciated by one of ordinary skill in the art that cross-fabric routes for enhanced forwarding enabled subnets may consume minimal FIB hardware resources on the internal leafs.

It will also be appreciated by one of ordinary skill in the art that the glean subnet prefix route may still need to be installed in the FIB LPM for ARP generation for discovery of silent hosts for subnets which have traditional forwarding enabled. Accordingly, for these across fabric subnets, it may still be necessary to install cross-fabric host routes in the FIB hardware tables on the internal leafs to ensure that traffic to these hosts is correctly forwarded to the border-leaf.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for improving routing for a stretched subnet, the method comprising:
    receiving a first communication on a border leaf of said stretched subnet, wherein said border leaf is a top of rack (ToR) switch configured to facilitate connectivity between an internal data center fabric and at least one external site associated with said stretched subnet;
    based on routing information received with said received communication, identifying a source address for said received communication as either from within said internal data center fabric or from said at least one external site;
    upon determining that said source address is from said external site, storing an abbreviated route based on said source address in at least one hardware table, wherein said abbreviated route is a route to said at least one external site and said at least one external site associated with said stretched subnet is limited to one entry in said at least one hardware table; and
    upon subsequent receipt of a second communication to be forwarded to said source address, forwarding said second communication in accordance with said abbreviated route.

2. The method according to claim 1 and also comprising:
    forwarding said routing information and an internal/external indication for said identified source to at least one other said ToR switch in said internal data center fabric, wherein said internal/external indication indicates whether said source address is in said internal data center fabric or in said at least one external site.

3. The method according to claim 1 wherein said at least one hardware table is a host routing table (HRT).

4. The method according to claim 1 wherein said routing information is advertised using Exterior Border Gateway Protocol (eBGP).

5. The method according to claim 1 and wherein said at least one external site associated with said stretched subnet is at least two or more external sites.

6. The method for improving routing for a stretched subnet, the method comprising:

receiving a first communication on a border leaf of said stretched subnet, wherein said border leaf is a top of rack (ToR) switch configured to facilitate connectivity between an internal data center fabric and at least one external site associated with said stretched subnet;

based on routing information received with said received communication, identifying a source address for said received communication as either from within said internal data center fabric or from said at least one external site; and upon determining that said source address is from said external site, storing an abbreviated route based on said source address in at least one hardware table, wherein said abbreviated route is a route to said at least one external site;

upon subsequent receipt of a second communication to be forwarded to said source address, forwarding said second communication in accordance with said abbreviated route; and forwarding said routing information and an internal/external indication for said identified source to at least one other said ToR switch in said internal data center fabric, wherein said internal/external indication is a site-of-origin (SOO) tag indicating whether said source address is in said internal data center fabric or in said at least one external site.

7. A method for improving routing for a stretched subnet, the method comprising:

receiving a first communication on a border leaf of said stretched subnet, wherein said border leaf is a top of rack (ToR) switch configured to facilitate connectivity between an internal data center fabric and at least one external site associated with said stretched subnet;

based on routing information received with said received communication, identifying a source address for said received communication as either from within said internal data center fabric or from said at least one external site; and upon determining that said source address is from said external site, storing an abbreviated route based on said source address in at least one hardware table, wherein said abbreviated route is a route to said at least one external site;

upon subsequent receipt of a second communication to be forwarded to said source address, forwarding said second communication in accordance with said abbreviated route; and forwarding said routing information and an internal/external indication for said identified source to at least one other said ToR switch in said internal data center fabric, wherein said internal/external indication is an AS PATH tag indicating whether said source address is in said internal data center fabric or in said at least one external site.

8. A method for improving routing for a stretched subnet, the method comprising:

on a ToR switch in an internal data center fabric of said stretched subnet, receiving routing information for a destination device, wherein said routing information comprises a destination address and an internal/external indication for said destination device, wherein said internal/external indication indicates whether said destination device is in said internal data center fabric or in an external data center fabric of said stretched subnet; and upon determining that said destination device is in said external data center fabric, storing an abbreviated route based on said destination address in at least one hardware table, wherein said abbreviated route is a route to said external data center fabric; and upon receipt of a communication to be forwarded to said destination address, forwarding said communication in accordance with said abbreviated route.

9. The method according to claim 8 wherein said at least one hardware table is a host routing table (HRT).

10. The method according to claim 8 wherein said routing information is advertised using Interior Border Gateway Protocol (iBGP).

11. The method according to claim 8 and wherein said internal/external indication is a site-of-origin (SOO) tag.

12. The method according to claim 8 and wherein said internal/external indication is an AS PATH tag.

13. The method according to claim 8 and also comprising:

receiving at least a second destination address and a second internal/external indication for said destination device, wherein said internal/external indication indicates that said second destination device is in a second external data center fabric of said stretched subnet; and upon receipt of a second communication to be forwarded to said second destination address, forwarding said second communication in accordance with said abbreviated route.

14. A method for increasing the number of destination devices in a stretched subnet, the method comprising:

in at least one hardware table on a ToR switch in a network fabric in said stretched subnet, defining a single abbreviated address for at least one external site in said stretched subnet; and routing all communications to each of said destination devices in said at least one external site according to said single abbreviated address.

15. The method according to claim 14 and also comprising:

propagating said at least one hardware table to at least one other said ToR switch in said network fabric.

16. The method according to claim 14 and wherein said routing comprises:

routing all said communications to each of said destination devices in more than one said external site according to said single abbreviated address.

17. The method according to claim 14 and also comprising:

populating said at least one hardware table in accordance with routing information received with communications received from said destination devices, wherein said routing information is used to determine whether said destination devices are in said at least one external site or whether said destination devices are in said network fabric with said ToR switch.

18. The method according to claim 14 wherein said at least one hardware table is a host routing table (HRT).

19. The method according to claim 14 and also comprising:

propagating said at least one hardware table to at least one other said ToR switch in said network fabric, wherein said propagating comprises providing an internal/external indication for entry in said at least one hardware table.

* * * * *